April 6, 1948.   G. E. JONES   2,439,134
CLUTCH AND BRAKE MECHANISM
Filed Oct. 5, 1945   2 Sheets-Sheet 1

INVENTOR
George E. Jones
BY John E Eastlack
ATTORNEY

April 6, 1948.  G. E. JONES  2,439,134
CLUTCH AND BRAKE MECHANISM
Filed Oct. 5, 1945  2 Sheets-Sheet 2

INVENTOR
BY George E. Jones
John E. Eastlack
ATTORNEY

Patented Apr. 6, 1948

2,439,134

UNITED STATES PATENT OFFICE 2,439,134

CLUTCH AND BRAKE MECHANISM

George Edmund Jones, London, England

Application October 5, 1945, Serial No. 620,573
In Great Britain August 29, 1945

10 Claims. (Cl. 192—17)

This invention relates to an improved drive transmission unit, wherein a V-rope drive may be employed direct to the driving head of a driven machine, such unit being intended more particularly for use with power driven sewing machines, coil winding machines and the like, where relatively high rotational speeds are involved and where an essential requirement is the engagement and disengagement of the driving and driven clutch members shall approximate closely to an instantaneous operation.

According to the present invention, the improved drive transmission unit comprises a driving clutch member rotatably mounted on a spindle and including a pulley whereby such clutch member is driven from a line shaft or the like, a sleeve axially movable upon the spindle carrying the driving clutch member, a driven clutch member rotatably mounted on such sleeve, and spaced from the driving clutch member, an operating lever fast upon such sleeve, and cam means between such sleeve, and a fixed member whereby movement of the operating lever effects rotational and axial movement of the sleeve to bring the clutch members into driving engagement. Brake means are provided upon a fixed member so as to be brought into contact with the driven clutch member simultaneously with the disengagement thereof from the driving clutch member and removed from contact with such driven clutch member when the latter is brought into engagement with the driving clutch member.

The transmission unit of the invention is preferably carried upon a bracket adapted to be secured to a sewing machine bench or the like, the driving clutch member and the sleeve on which the driven clutch member is rotatable being rotatably mounted on a shaft secured in such bracket, and the cam face or faces coacting with the cam face or faces provided on the sleeve being formed as part of such bracket. The bracket further may conveniently be constructed as the support for the brake means for the driven clutch member.

In accordance with the invention, the transmission unit is adjustably supported upon the bracket so that the distance therefrom from the sewing machine bench or the like may be varied as desired, e. g., in order to adjust the tension in the driving belt between such transmission unit and the sewing machine or the like to be driven. Similarly, means are provided in accordance with the invention for adjustment of the distance between the driving and the driven clutch members in their idle positions, e. g., in order to take up wear on the clutch faces.

The improved transmission unit is further of such construction as to enable the use therewith of V-rope driving belts, extending from the line shaft to the transmission unit and from the latter direct to the driving head of the sewing machine or the like, thus obviating the disadvantages arising from the use of round belting with hook fasteners which must be employed with prior known transmission units for this purpose.

The invention may be carried into practice as shown in the accompanying drawings, wherein there is illustrated a drive transmission unit according to the invention supported on the under side of a sewing machine bench or the like. It is however to be understood that the illustrated embodiment of the invention is given by way of example, only, and that the improved drive transmission unit may be employed in any situation where a rapid engagement and disengagement of driven and driving clutch members is required together with a rapid and efficient braking of the driven member on disengagement of the clutch.

In the said accompanying drawings.

Figure 1:
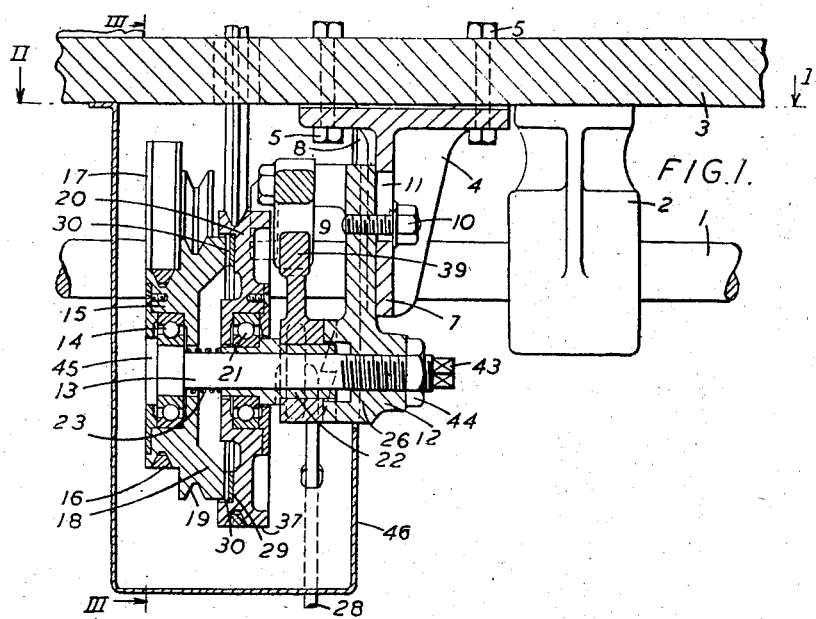
Figure 1 is a side elevation in section of a drive transmission unit in accordance with the invention, mounted upon the lower face of a sewing machine bench.
Figure 2:
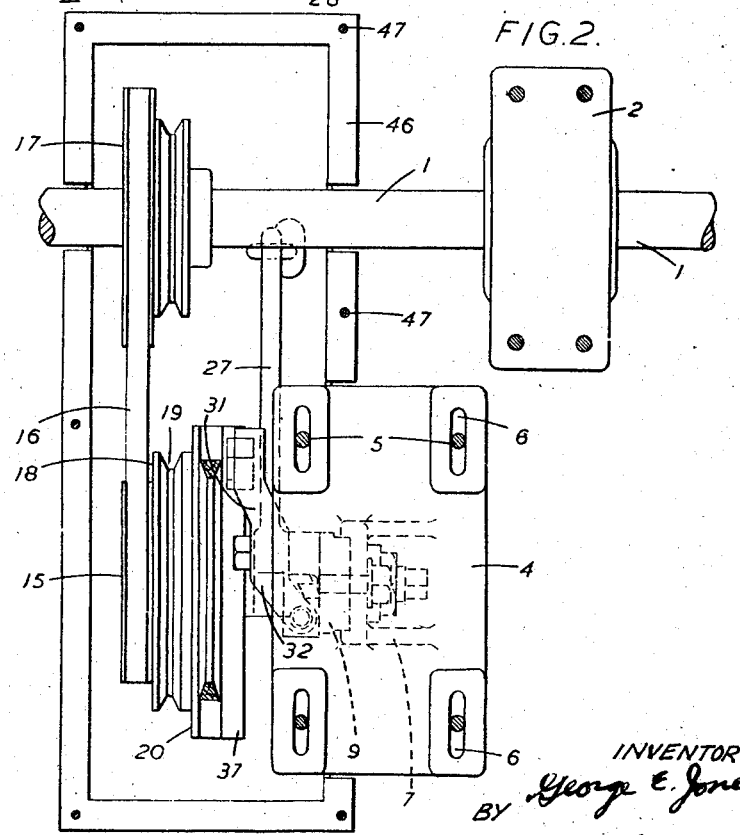
Figure 2 is a plane view of such unit, on the line II—II of Figure 1.
Figure 3:
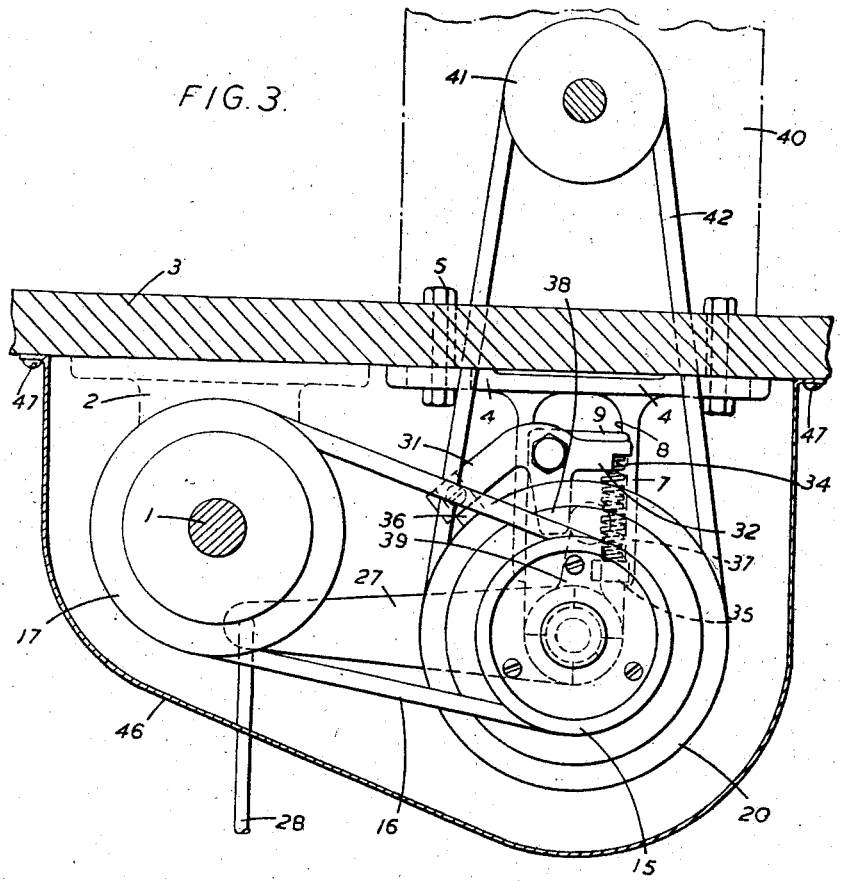
Figure 3 is an end view on the line III—III of Figure 1.

Referring to the drawings, a main or line shaft 1 is supported in suitable bearings 2, one only of which is shown in the drawings, upon the lower surface of a sewing machine or other bench 3. Bolted to the bench 3 is a bracket 4 secured to the bench 3 by means of bolts 5 passing through elongated slots 6 in the bracket and suitably positioned holes in the bench. A guideway 8 is formed in flange 7 extending vertically downwardly from the bracket 8, a carrier member 9 being vertically movable in such guideway, and being fixedly secured at any desired position therein by means of a bolt 10 passing through a slot 11 in the flange 7 and a hole in the carrier member 9.

The lower end 12 of the member 9 has an internally screw-threaded bore therein, in which is engaged the screw-threaded end of a stationary spindle 13. On the other end of the spindle 13 there is rotatably mounted on ball bearings 14 a pulley 15 connected by a V-belt 16 to a driving pulley 17 fast on the line shaft 1. An axial extension 18 of the pulley 15 and of larger diameter forms the driving clutch member, and may be provided with a groove 19 for reception of a V-section driving belt.

The driven clutch member comprises a pulley 20 rotatably mounted on ball bearings 21 on a sleeve 22 axially movable upon the spindle 13. A spring 23 on the spindle 13 urges the sleeve 22 in a direction away from the pulley 15 and clutch member 18. The sleeve 22 has cam faces 24 formed on the end face thereof remote from the clutch member 18, and coacting cam faces 25 are formed on the end face of a hollow cylindrical extension 26 of the member 12. The inoperative position of the clutch members 18 and 20 is shown in Figure 1, where the clutch member 20 is held out of contact with the clutch member 18 by the spring 23.

An operating lever 27 fast upon the sleeve 22 is connected with suitable links 28 to a pedal (not shown) whereby the operator may engage the driving and the driven clutch members against the pressure of the spring 23.

A friction lining 29, e. g., of leather is secured in a recess in the face of the driven clutch member 20 directed towards the driving clutch member 18, such lining 29 being brought into contact with an edge face 30 on the driving clutch member 18 when the sleeve 22 is moved axially upon the spindle 13 by the cam faces 24 on the end face thereof riding upon the cam faces 25 on the stationary part 26 on the member 12.

A three-armed lever 31, 32, 38 is pivotally mounted at 33 on the upper end of the carrier member 9, a spring 34 acting between a fixed abutment 35 on the member 9 and the free end of the arm 32 of the bell-crank lever urging a brake-block 36 carried on the free end of the other arm 31 of such lever into contact with a peripheral brake surface 37 provided on the driven clutch member 20. A finger 39 on the sleeve 22 engages the arm 38 of the three-armed lever to rock the same against the pressure of the spring 34 to bring the brake-block 36 away from the surface 37 when the lever 27 is moved to engage the clutch members 18 and 20.

The operation of the transmission unit is as follows:

The pulley 17 on the line shaft 1 is rotating to drive the pulley 15 on the spindle 13, the pulley 20 being at rest, and the sewing machine or the like, indicated at 40, driven through a pulley 41 connected to the pulley 20 by a V-belt 42, is similarly not in operation, the pulley 20 being held by the spring 23 in a position where the friction lining 29 is out of engagement with the surface 30 of the driving clutch member 18.

When the operator presses upon a pedal or other lever connected by links 28 to the lever 27, the lever 27, which is fast upon the sleeve 22, causes such sleeve 22 to rotate in a clock-wise direction, whereon the cam surfaces 24 on the end of such sleeve ride upon the cam surfaces 25 on the stationary member 26 and impart an axial movement to the sleeve in the direction towards the driving clutch member 18. At the same time the finger 39 moves the arm 38 of the three-armed lever 31, 32, 38 against the pressure of the spring 34, to lift the brake-block 36 on the free end of the arm 31 from engagement with the surface 37 of the driven clutch member 20.

Figure 4:
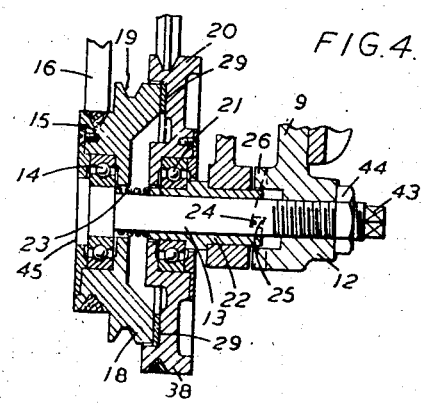
Figure 4 is a detail view in section showing the positions of the clutch members in their engaged positions.

The axial movement of the sleeve 22 thus caused brings the friction lining 29 on the driven clutch member 20 into contact with the surface 30 of the driving clutch member, the two clutch members then rotating together to drive the sewing machine or the like 40 through the V-belt 42 and pulley 41. When the pressure on the pedal or other lever is relaxed, the springs 23 and 34 return the sleeve 22 and the pulley 20 from the positions shown in Figure 4, to the positions shown in Figure 1, the pulley 20 being thus immediately braked by the block 36 on the arm 31 as the driven clutch member 20 moves out of engagement with the driving clutch member 18.

In order to take up wear or to adjust the normal distance between the engaging faces of the driven clutch member 20 and the driving clutch member 18, the squared end 43 of the spindle 13 is rotated to draw the spindle 13 towards the end 12 of the stationary member 9, an enlarged head 45 on the other end of the spindle drawing the driving clutch member 18 towards the driven clutch member 20. When the distance between the engaging faces of the two clutch members has been adjusted to the desired dimension, the locking nut 44 is tightened to hold the spindle 13 against rotation.

An outer casing 46 secured to the bench 3 by screws 47 is preferably provided to enclose the improved transmission unit.

By means of the adjustable mounting of the member 9 in the guideway 8 formed in the flange 7 of the bracket 4, it will be appreciated that the distance of the transmission unit as a whole beneath the bench 3 may be varied as desired in order to adjust the tension in the V-belts connecting respectively the driving pulley 17 on the line shaft 1 with the driving clutch member 18 and the pulley 41 of the sewing machine or the like 40 with the driven clutch member 20. Similarly, by reason of the mounting of the base plate upon the bench 3 through the bolts 5 passing through the elongated slots 6 in such bracket, the transmission unit may be moved as a whole either backwards or forwards with respect to the line shaft 1 in order to provide for adjustment of the V-belt drive between the transmission unit and the line shaft.

I claim:

1. A drive transmission unit for the purposes set forth, comprising a driving clutch member rotatably mounted on a spindle and including a pulley whereby such clutch member is driven from a main or line shaft, a sleeve axially movable upon the spindle, a driven clutch member rotatably mounted on the sleeve and spaced from the driving clutch member, an operating lever fast upon such sleeve, a member fixed with respect to said spindle, and cam means between such sleeve and fixed member whereby rotational movement of the sleeve imparted by the operating lever imparts axial movement to the sleeve to bring the clutch members into driving engagement.

2. A transmission unit according to claim 1, wherein the clutch members are disengaged upon release of the operating lever and brake means associated with the axially movable sleeve are brought into engagement with the driven clutch member simultaneously with the disengagement of the clutch members.

3. A transmission unit according to claim 1, wherein the driving and driven clutch members are urged apart by spring means.

4. A transmission unit according to claim 1, wherein a cam face is formed in the end face of the sleeve, such cam face coacting with a corresponding cam face formed in the fixed member.

5. A transmission unit according to claim 1, wherein a three-armed lever is pivotally mounted in the fixed member, and normally presses a brake block on the free end of one arm of the lever against a brake surface provided upon the driven clutch member by the action of spring means against the free end of another of the arms of such lever.

6. A transmission unit according to claim 5, wherein the third arm of the three-armed lever is engaged by a finger provided upon the operating lever to rock the three-armed lever upon its pivot to bring the brake-block out of engagement with the brake surface on the driven clutch member.

7. A transmission unit according to claim 5, wherein the fixed member, whereon is pivoted the three-armed lever and whereon are formed the cam surfaces to coact with the cam surfaces on the end of the axially movable sleeve, is adjustably mounted in a bracket whereby the transmission unit as a whole is adapted to be mounted upon a sewing machine bench.

8. A transmission unit according to claim 1, wherein adjustment of the distance between the engaging faces of the two clutch members is provided.

9. A transmission unit according to claim 8, wherein such adjustment is obtained by axial movement of the spindle on which the driving clutch member is mounted within its support in the fixed member.

10. A transmission unit according to claim 1, wherein elongated slots are provided in a part of a bracket whereby the transmission unit is held upon a bench, so as to provide variation in the effective distance between the driving clutch member of the unit and the line shaft.

GEORGE EDMUND JONES.

REFERENCES CITED

The following references are of record in the file of this patent:

UNITED STATES PATENTS

| Number | Name | Date |
|---|---|---|
| 967,331 | Covell | Aug. 16, 1910 |
| 1,147,377 | Corrall | July 20, 1915 |
| 1,196,469 | Merritt | Aug. 29, 1916 |
| 1,962,715 | Heilman | June 12, 1934 |
| 2,068,929 | Peets | Jan. 26, 1937 |
| 2,332,862 | LeTourneau | Oct. 26, 1943 |